US008615258B2

(12) United States Patent
Luft et al.

(10) Patent No.: US 8,615,258 B2
(45) Date of Patent: Dec. 24, 2013

(54) HOME BASE STATION COMMUNICATION WITH A MOBILE RADIO COMMUNICATION DEVICE USING A HOME BASE STATION GROUP MEMBER IDENTIFIER

(75) Inventors: Achim Luft, Braunschweig (DE); Martin Hans, Bad Salzdetfurth (DE); Hyung-Nam Choi, Hamburg (DE); Andreas Schmidt, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1093 days.

(21) Appl. No.: 12/357,497

(22) Filed: Jan. 22, 2009

(65) Prior Publication Data

US 2010/0184454 A1  Jul. 22, 2010

(51) Int. Cl.
*H04W 64/00* (2009.01)

(52) U.S. Cl.
USPC ............... 455/456.5; 455/434; 455/456.1; 455/458; 455/410; 455/422.1; 370/254; 370/335

(58) Field of Classification Search
USPC .............. 455/410–411, 416, 435.1, 518, 434, 455/456.1, 458, 404.1, 445, 403, 436, 509, 455/422.1, 456.5; 370/254, 400, 335, 522, 370/395.5; 375/211; 379/45, 229
See application file for complete search history.

(56) References Cited

U.S. PATENT DOCUMENTS

| | | | |
|---|---|---|---|
| 7,039,430 B2 | 5/2006 | Kang et al. | |
| 7,335,971 B2 | 2/2008 | Funk | |
| 7,343,167 B2 | 3/2008 | Kang et al. | |
| 7,515,560 B2 | 4/2009 | DuMas et al. | |
| 2004/0197953 A1 | 10/2004 | Funk | |
| 2004/0253959 A1* | 12/2004 | Hwang et al. | 455/450 |
| 2005/0250474 A1 | 11/2005 | Hong et al. | |
| 2007/0053308 A1 | 3/2007 | DuMas et al. | |
| 2007/0105567 A1 | 5/2007 | Mohanty et al. | |
| 2007/0123195 A1 | 5/2007 | Lv et al. | |
| 2007/0243872 A1 | 10/2007 | Gallagher et al. | |
| 2008/0081696 A1 | 4/2008 | Schultz | |
| 2008/0114834 A1 | 5/2008 | Miyazaki | |

(Continued)

FOREIGN PATENT DOCUMENTS

| | | |
|---|---|---|
| CN | 101291249 A | 10/2008 |
| GB | 2432082 A | 5/2007 |
| WO | 2004064342 A1 | 7/2004 |
| WO | WO 2009043002 A2 * | 4/2009 |

OTHER PUBLICATIONS

3GPP TS 25.467, V8.0.0 (Dec. 2008); 3rd Generation Partnership Project; Technical Specification Group Radio Access Network; UTRAN architecture for 3G Home NodeB; Stage2 (Release8); pp. 1-23.
English abstract of CN 101291249 A.

*Primary Examiner* — Mahendra Patel

(57) ABSTRACT

In an embodiment, a mobile radio communication device is provided. The mobile radio communication device may include a mobile radio communication protocol circuit configured to provide a home base station function for a mobile radio communication with another mobile radio communication device, and a memory configured to store a home base station group data structure, wherein the home base station group data structure for each communication device associated with the home base station group comprises a home base station group member identifier to identify a mobile radio communication device as a member of the home base station group.

28 Claims, 7 Drawing Sheets

(56) References Cited

U.S. PATENT DOCUMENTS

| | | |
|---|---|---|
| 2008/0182586 A1 | 7/2008 | Aaron |
| 2008/0253312 A1* | 10/2008 | Park ............................. 370/311 |
| 2008/0254833 A1 | 10/2008 | Keevill et al. |
| 2008/0267153 A1* | 10/2008 | Mukherjee et al. .......... 370/338 |
| 2009/0093232 A1* | 4/2009 | Gupta et al. ................. 455/410 |
| 2009/0104905 A1* | 4/2009 | DiGirolamo et al. ......... 455/434 |
| 2009/0187690 A1* | 7/2009 | Smart et al. ................... 710/105 |
| 2009/0264126 A1* | 10/2009 | Khetawat et al. .......... 455/435.1 |
| 2009/0305699 A1* | 12/2009 | Deshpande et al. .......... 455/434 |
| 2010/0112980 A1* | 5/2010 | Horn et al. .................... 455/411 |
| 2010/0112982 A1* | 5/2010 | Singh et al. ................... 455/411 |
| 2010/0226314 A1* | 9/2010 | Xu ................................. 370/328 |
| 2010/0323663 A1* | 12/2010 | Vikberg et al. ............... 455/410 |

* cited by examiner

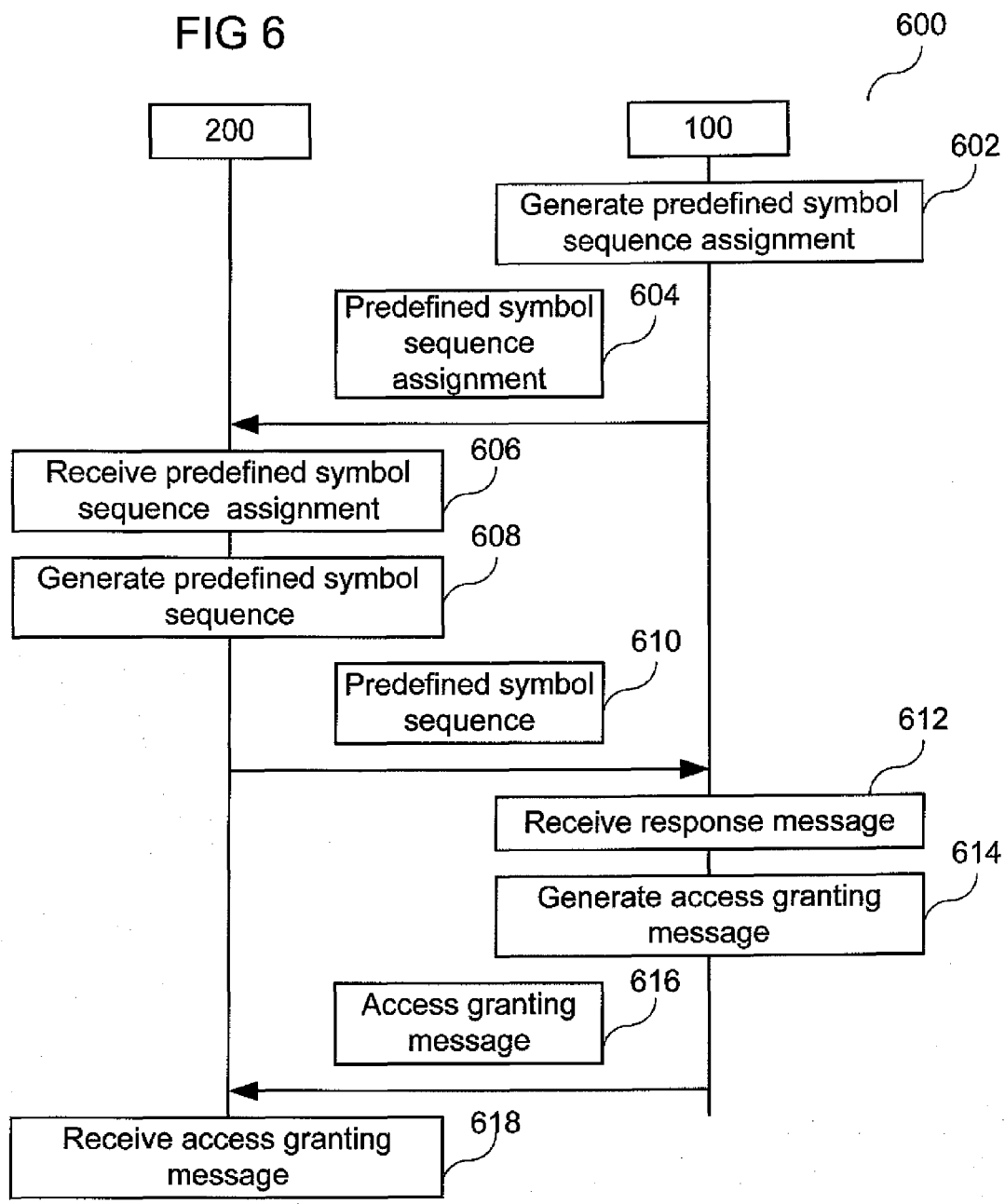

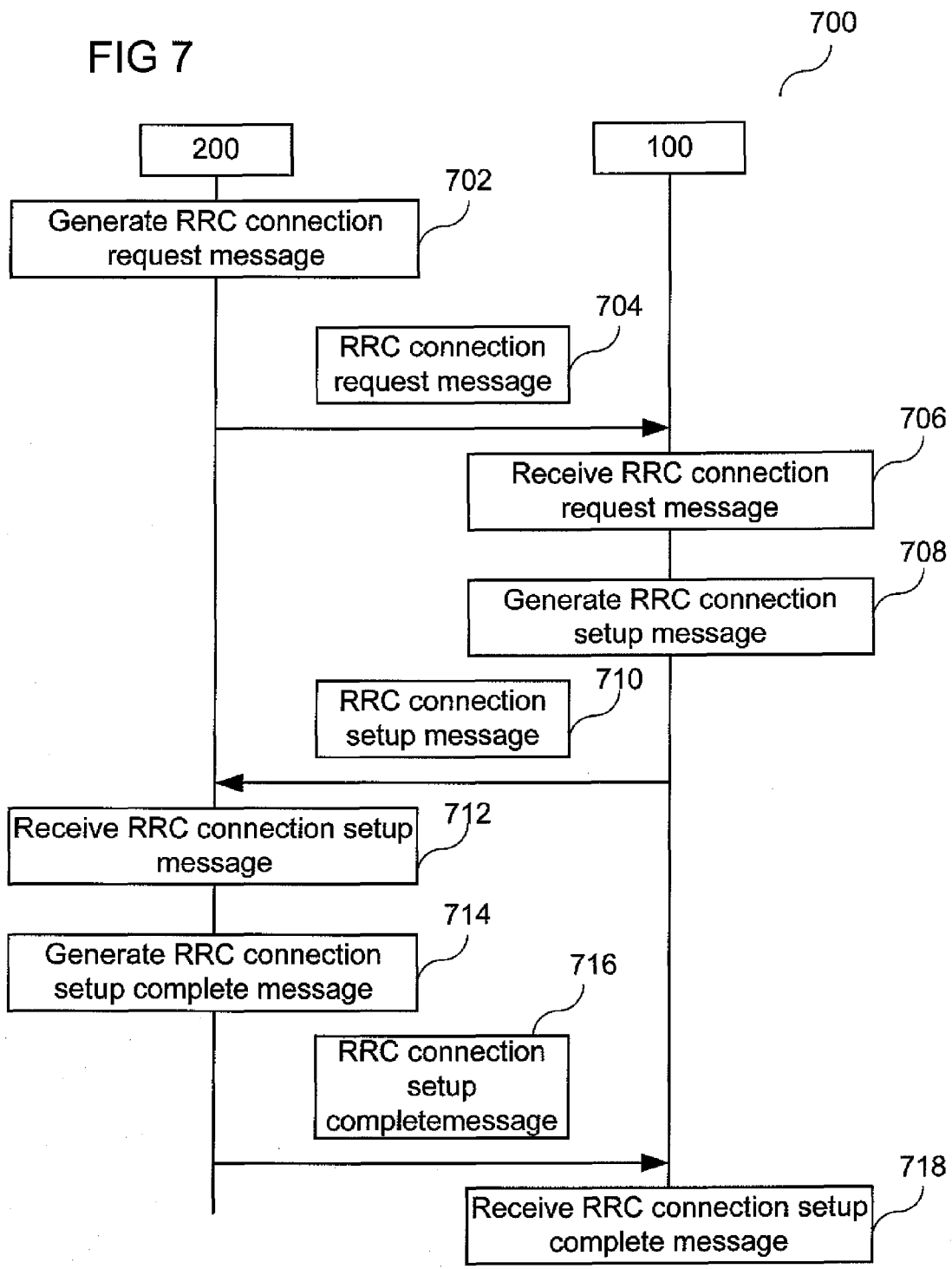

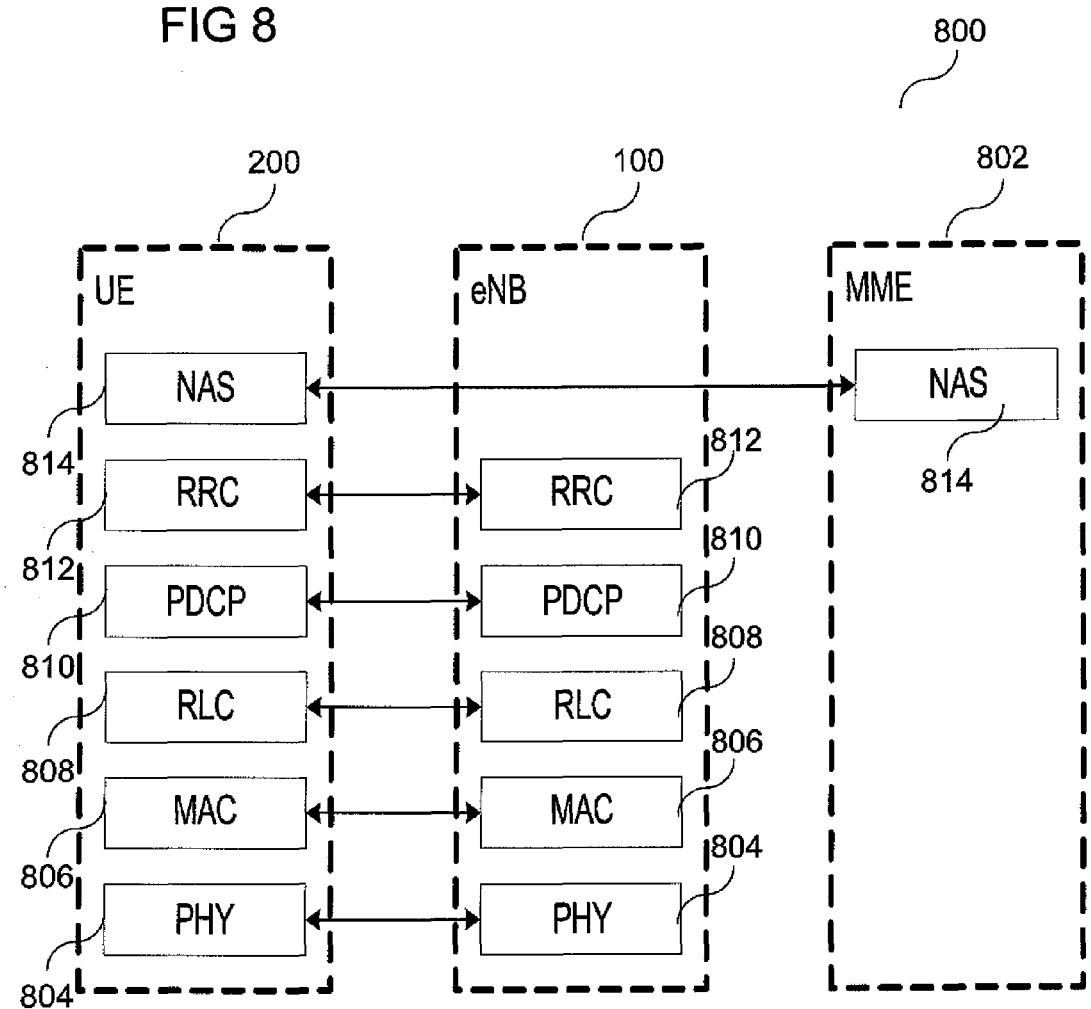

HOME BASE STATION COMMUNICATION WITH A MOBILE RADIO COMMUNICATION DEVICE USING A HOME BASE STATION GROUP MEMBER IDENTIFIER

TECHNICAL FIELD

Various embodiments relate generally to mobile radio communication devices and methods for operating the same.

BACKGROUND

In cellular mobile radio communication networks (e.g. UMTS (Universal Mobile Telecommunications System), LTE (Long Term Evolution)) coverage is based on overlapping cells. Each mobile radio cell may include at least one base station (in UMTS called NodeB and in LTE called eNodeB). The behavior of a mobile radio communication device that is moving through different mobile radio cells is dependent on the state the mobile radio communication device is in. In a so-called "active" state (e.g. user is in a call) the mobile radio communication network usually triggers a handover from one mobile radio cell to another based on measurements performed by the mobile radio communication device. In a so-called "idle" state (e.g. user is only ready to be called) the mobile radio cells are divided into groups. Such a group is called a "Location Area", "Paging Area" or "Tracking Area". If the mobile radio communication network tries to establish a mobile radio communication connection with the mobile radio communication device, the mobile radio communication device is usually paged in the whole paging area. If the mobile radio communication device receives the paging, it switches into active state and registers in the current mobile radio cell. Within one paging area a mobile device in idle state does not register and de-register to single mobile radio cells. Therefore, the mobile radio communication network is not aware of the current mobile radio cell the mobile radio communication device is in. If the mobile device in idle state leaves a paging area and enters another one the mobile radio communication device makes a Location Area Update (LAU) via a random access channel which is a shared resource.

In a cellular mobile radio communication network according to LTE standards, the access network is conventionally not only built of standard mobile radio base stations but also of so-called Home (e)NodeBs (HNB). As a mobile radio cell with a mobile radio base station is also called mobile radio macro cell a mobile radio cell with an HNB may also be called mobile radio femto cell. An HNB is a consumer device that is connected to the mobile radio core network via fixed line (e.g. DSL) or wireless to a mobile radio macro cell. It provides access to legacy mobile devices and increases the coverage in buildings and the bandwidth per user. An HNB could be run in open or closed mode. In closed mode the HNB provides access to a so-called closed subscriber group (CSG) only. Examples for such closed subscriber groups are families or some or all employees of a company, for example.

Conventionally, the HNB has no information about mobile radio communication devices entering the mobile radio cell in idle state. As long as the mobile radio cell belongs to another paging area as the mobile radio macro cell at least some elements in the mobile radio communication network were informed whether a mobile radio communication device is within an HNB, but there does not exist any means to pass on this piece of information to the HNB. A(n) (e)NodeB conventionally is stateless, which means it has no information of the identity of the users in the mobile radio cell.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various embodiments. In the following description, various embodiments are described with reference to the following drawings, in which:

FIG. 6 shows a message flow diagram illustrating an initial access procedure in accordance with an embodiment;

FIG. 7 shows a message flow diagram illustrating an RRC connection setup procedure in accordance with an embodiment; and FIG. 8 shows a protocol layer diagram in accordance with an embodiment.

DESCRIPTION

The following detailed description refers to the accompanying drawings that show, by way of illustration, specific details and embodiments in which the invention may be practiced. These embodiments are described in sufficient detail to enable those skilled in the art to practice various embodiments. Other embodiments may be utilized and structural, logical, and electrical changes may be made without departing from the scope of the invention. The various embodiments are not necessarily mutually exclusive, as some embodiments can be combined with one or more other embodiments to form new embodiments.

In various embodiments, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java, thereby e.g. implementing an individually programmed circuit. Any other kind of implementation of the respective functions which will be described in more detail below may also be understood as a "circuit" in accordance with an alternative embodiment. In an embodiment, a plurality of circuits may be partially or completely implemented in one common circuit such as e.g. in one common processor such as e.g. one common microprocessor.

Figure 1:
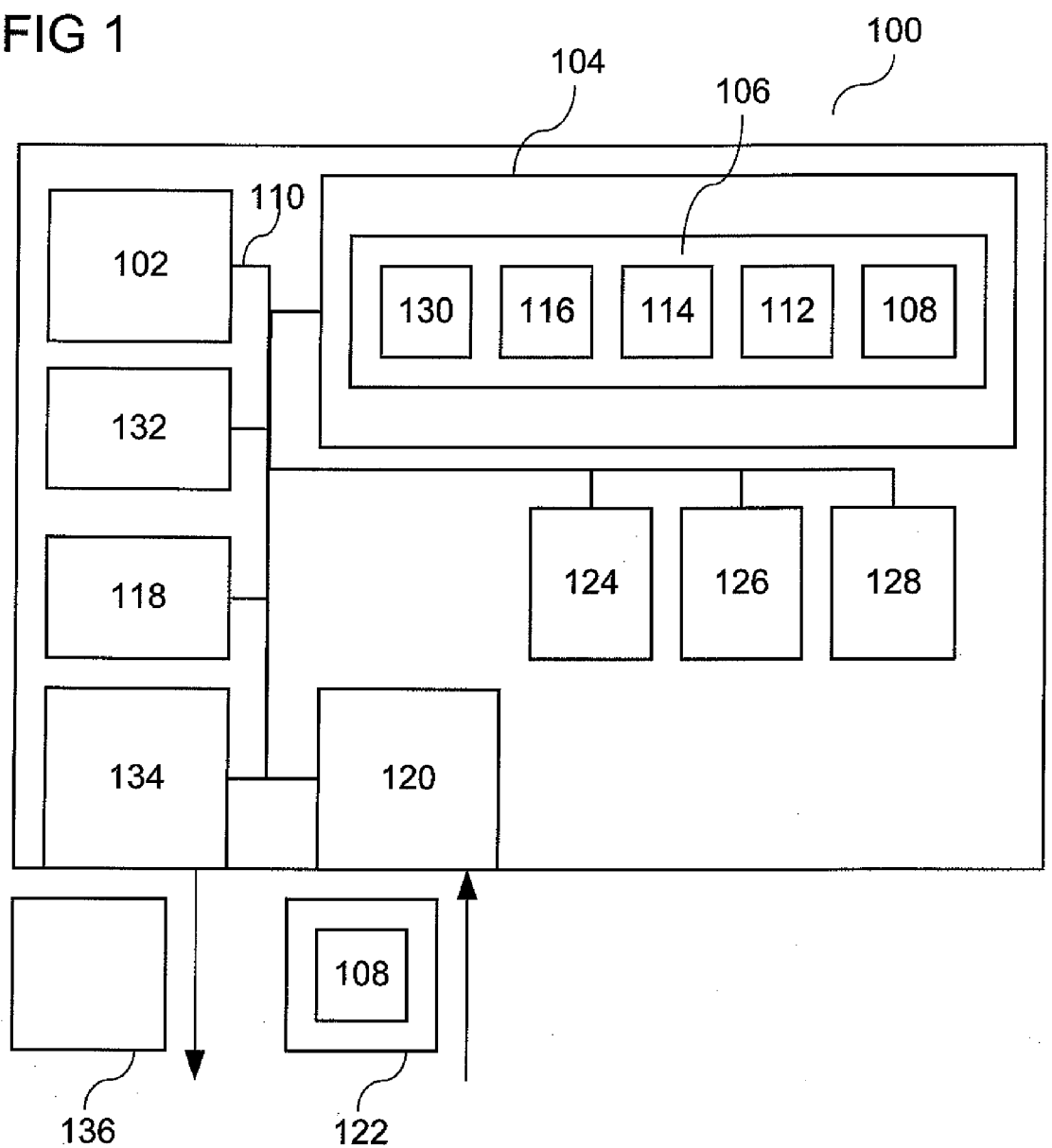
FIG. 1 shows mobile radio communication device in accordance with an embodiment.

FIG. 1 shows mobile radio communication device 100 in accordance with an embodiment. In an embodiment, the mobile radio communication device 100 may include a mobile radio communication protocol circuit 102 configured to provide a home base station function for a mobile radio communication with another mobile radio communication device, and a memory 104 configured to store a home base station group data structure 106, wherein the home base station group data structure for each mobile radio communication device associated with the home base station group includes a home base station group member identifier 108 to identify a mobile radio communication device as a member of the home base station group. The mobile radio communication protocol circuit 102 and the memory 104 may be coupled with each other via a connection 110 such as e.g. a wire, a cable, an optical connection, a wireless connection (e.g. a short range radio connection), a bus connection, or the like.

The mobile radio communication device 100 and thus e.g. also the mobile radio communication protocol circuit 102 may be configured in accordance with a Third Generation Partnership Project mobile radio communications standard. By way of example, the mobile radio communication device 100 and thus e.g. also the mobile radio communication protocol circuit 102 may be configured in accordance with one or more of the following mobile radio communications standards:

Universal Mobile Telecommunications System (UMTS) mobile radio communications standard;
Long Term Evolution (LTE) mobile radio communications standard;
Code Division Multiple Access (CDMA) mobile radio communications standard;
Code Division Multiple Access 2000 (CDMA 2000) mobile radio communications standard;
Freedom of Mobile Multimedia Access (FOMA) mobile radio communications standard;
Global System for Mobile Communications (GSM) mobile radio communications standard; and
Enhanced Data rates for GSM Evolution (EDGE) mobile radio communications standard.

In an embodiment, the home base station group data structure 106 may further include a home base station group identifier 112 to identify the home base station group. The home base station group member identifier 112 may be unique for each member of the home base station group. Furthermore, each member of the home base station group may be a subscriber of the home base station group. In another embodiment, the home base station group data structure 106 may further include for each mobile radio communication device 100 a mobile radio communication device identifier 114, wherein the mobile radio communication device identifier 114 may be unique in the mobile radio communication core network. In an implementation, the mobile radio communication device identifier 114 may be a Mobile Subscriber ISDN (MISDN) number. Moreover, the home base station group data structure 106 may further include for each mobile radio communication device 100 an availability information 116 representing the availability of the mobile radio communication device 100 within a radio coverage area of the mobile radio communication device 100. Moreover, the home base station group data structure 106 may further include for each mobile radio communication device 100 an assignment information 130 which assigns each home base station group member identifier 112 to a respective mobile radio communication device identifier 114.

In another embodiment, the mobile radio communication device 100 may further include an availability information determination circuit 118 configured to determine the availability information using the home base station group member identifier. The availability information determination circuit 118, the mobile radio communication protocol circuit 102 and the memory 104 may be coupled with each other via the connection 110 such as e.g. a wire, a cable, an optical connection, a wireless connection (e.g. a short range radio connection), a bus connection, or the like. Alternatively, the availability information determination circuit 118 may be coupled with the mobile radio communication protocol circuit 102 and/or the memory 104 via separate connections such as e.g. separate wires, separate cables, separate optical connections, separate wireless connections (e.g. separate short range radio connections), separate bus connections, or the like. It should be noted that in an embodiment, the mobile radio communication protocol circuit 102 and the availability information determination circuit 118 may be implemented in one common processor.

In another embodiment, the mobile radio communication device 100 may further include a home base station group member receiving circuit 120 configured to receive a home base station group member message 122 which includes the home base station group member identifier 108, which may be stored in the memory 104, for example. In an example of this embodiment, mobile radio communication device 100 may further include a home base station group member identifier determining circuit 132. The home base station group member identifier determining circuit 132 may be configured to determine a home base station group member identifier 108 from a received home base station group member message 122, e.g. by parsing a respectively received home base station group member message 122.

In an embodiment, the home base station group member message 122 may be a Location Area Update (LAU) message.

In another embodiment, the mobile radio communication device 100 may further include a transmitter 134 configured to transmit a message 136 to the Core Network. The message may be e.g. the home base station group member message (thus e.g. a Location Area Update (LAU) message (this would clearly correspond to a forwarding of the respectively received Location Area Update (LAU) message to the Core Network without changing the message itself) or e.g. a message derived from the respectively received Location Area Update (LAU) message, e.g. by deleting the home base station group member identifier 108 from the respectively received Location Area Update (LAU) message and sending the remaining information forward to the Core Network (this would clearly correspond to a forwarding of the respectively received Location Area Update (LAU) message reduced by the home base station group member identifier 108).

In an embodiment, the home base station group may be a closed subscriber group.

In another embodiment, the mobile radio communication device 100 may optionally further include a home base station local service circuit 124 configured to provide a home base station local service to the members of the home base station group using the home base station group member identifiers 108. By way of example, the home base station local service circuit 124 may be configured to provide those home base station group member identifiers 108 that are subscribed to the home base station local service and that are presently available for the mobile radio communication device 100.

In an embodiment, the home base station local service circuit 124 may be configured to provide a voice service and/or a data service and/or a multimaedia service such as e.g. a video conferencing service. In an embodiment, the home base station local service circuit 124 may be configured to provide one or more of the following home base station local services:

a presence service,
an instant messaging service,
a message board service,
a voice mail box service,
a media streaming service, a Voice over Internet Protocol service, and
an access control service.

By way of example, the home base station local service circuit 124 may be configured to use the stored home base station group member identifier 108 for physically addressing the respective communication device for the home base station local service.

In another embodiment, the mobile radio communication device 100 may optionally further include a radio resource control protocol circuit 126 configured to provide the function(s) of a radio resource control protocol.

In another embodiment, the mobile radio communication device 100 may optionally further include a non-access stratum protocol circuit 128 configured to provide the function of a non-access stratum protocol.

The home base station group member receiving circuit 120, the home base station local service circuit 124, the radio resource control protocol circuit 126, the non-access stratum protocol circuit 128, the home base station group member identifier determining circuit 132, and the transmitter 134 may be coupled with each other and/or with the availability information determination circuit 118, the mobile radio communication protocol circuit 102 and the memory 104 via the connection 110 such as e.g. a wire, a cable, an optical connection, a wireless connection (e.g. a short range radio connection), a bus connection, or the like. Alternatively, the circuits 102, 118, 120, 124, 126, 128 may be coupled with each other and/or with the memory 104 via separate connections such as e.g. separate wires, separate cables, separate optical connections, separate wireless connections (e.g. separate short range radio connections), separate bus connections, or the like. It should be noted that in an embodiment, the circuits 102, 118, 120, 124, 126, 128, 132, 134 may be implemented in one common processor.

In an embodiment, the mobile radio communication device 100 may be configured as a home base station, e.g. as a Home NodeB, e.g. as a Home (e)NodeB. In an example, a 'Home NodeB' may be understood in accordance with 3 GPP as a trimmed-down version of a cellular mobile radio base station optimized for use in residential or corporate environments (e.g., private homes, public restaurants or small office areas). In various examples throughout this description, the terms 'Home Base Station', 'Home NodeB', 'Home eNodeB', and 'Femto Cell' are referring to the same logical entity and will be used interchangeably throughout the entire description.

The so-called 'Home Base Station' concept shall support receiving and initiating cellular calls at home, and uses a broadband connection (typically DSL, cable modem or fibre optics) to carry traffic to the operator's core network bypassing the macro network architecture (including legacy NodeBs or E-NodeBs, respectively), i.e. the legacy UTRAN or E-UTRAN, respectively. Femto Cells shall operate with all existing and future handsets rather than requiring customers to upgrade to expensive dual-mode handsets or UMA devices.

From the customer's perspective, 'Home NodeBs' offer the user a single mobile handset with a built-in personal phonebook for all calls, whether at home or elsewhere. Furthermore, for the user, there is only one contract and one bill. Yet another effect of providing 'Home NodeBs' may be seen in the improved indoor network coverage as well as in the increased traffic throughput. Moreover, power consumption may be reduced as the radio link quality between a handset and a 'Home Base Station' may be expected to be much better than the link between a handset and legacy 'NodeB'.

In an embodiment, access to a 'Home NodeB' may be allowed for a closed user group only, i.e. the communication service offering may be restricted to employees of a particular company or family members, in general, to the members of the closed user group. This kind of 'Home Base Stations' may be referred to as 'Closed Subscriber Group Cells' (CSG Cells) in 3GPP. A mobile radio cell which indicates being a CSG Cell may need to provide its CSG Identity to the mobile radio communication terminal devices (e.g. the UEs). Such a mobile radio cell may only be suitable for a mobile radio communication terminal device if its CSG Identity is e.g. listed in the mobile radio communication terminal device's CSG white list (a list of CSG Identities maintained in the mobile radio communication terminal device or in an associated smart card indicating the mobile radio cells which a particular mobile radio communication terminal device is allowed to use for communication). In various embodiments, a home base station may be a consumer device that is connected to the mobile radio core network via fixed line (e.g. DSL) or wireless to a mobile radio macro cell. It may provide access to legacy mobile devices and increase the coverage in buildings and the bandwidth per user. In various embodiments, a home base station may be run in open or closed mode. In closed mode the home base station may provide access to a so-called closed subscriber group (CSG) only. Examples for such closed subscriber groups are families or some or all employees of a company, for example.

As a 'Femto Cell' entity or 'Home Base Station' entity will usually be a box of small size and physically under control of the user, in other words, out of the MNO's domain, it could be used nomadically, i.e. the user may decide to operate it in his apartment, but also in a hotel when he is away from home, e.g. as a business traveller. Additionally a 'Home NodeB' may be operated only temporarily, i.e. it can be switched on and off from time to time, e.g. because the user does not want to operate it over night or when he leaves his apartment.

Figure 2:
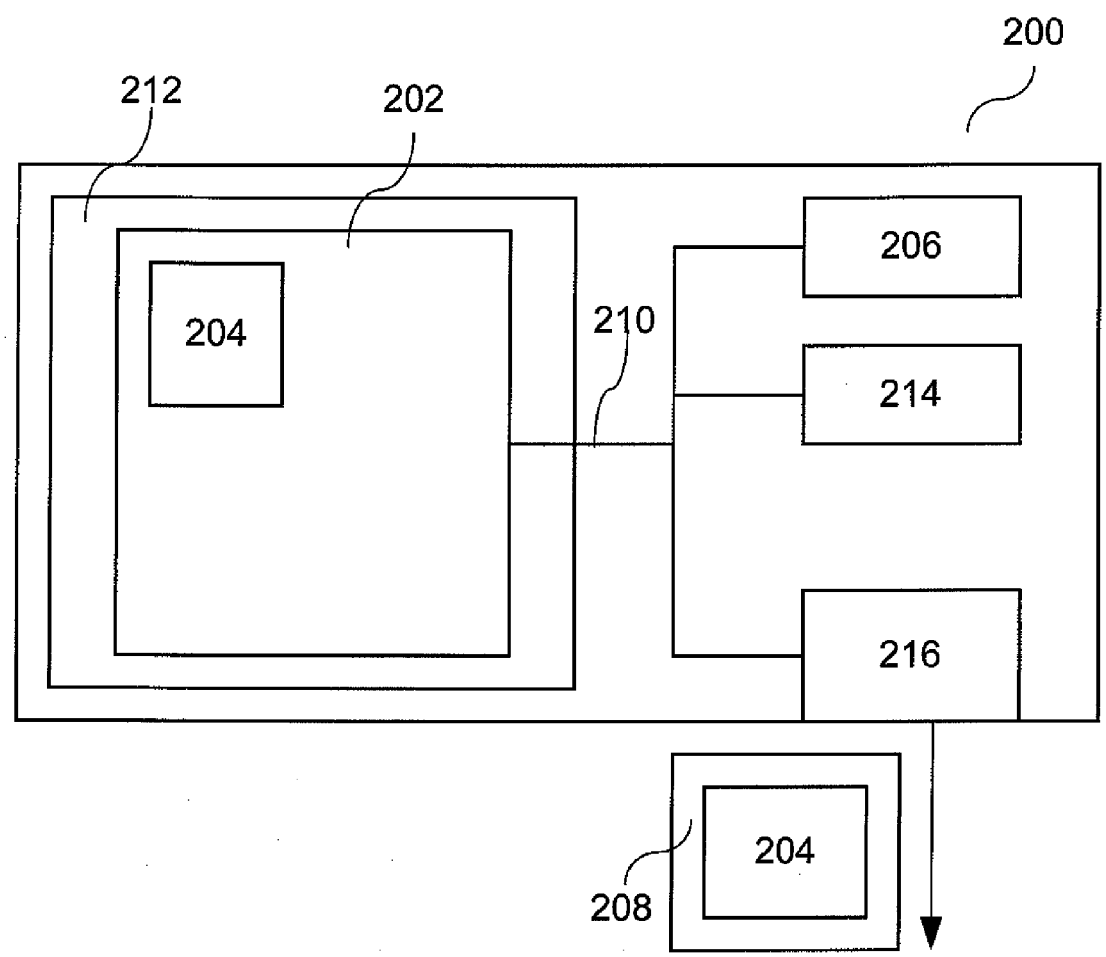
FIG. 2 shows mobile radio communication device in accordance with another embodiment.

FIG. 2 shows mobile radio communication device 200 in accordance with another embodiment. The mobile radio communication device 200 may include a memory 202 configured to store a home base station group member identifier 204 to identify the mobile radio communication device as a member of a predefined home base station group. Furthermore, the mobile radio communication device 200 may include a message generator 206 configured to generate a home base station group member message 208 which includes the home base station group member identifier 204. The memory 202 and the message generator 206 may be coupled with each other via a connection 210 such as e.g. a wire, a cable, an optical connection, a wireless connection (e.g. a short range radio connection), a bus connection, or the like.

In an embodiment, the mobile radio communication device 200 may be configured as a mobile radio communication terminal device, e.g. as a User Equipment (UE) or as a Mobile Equipment (ME). In an embodiment, the mobile radio communication device 200 may be configured in accordance with a Third Generation Partnership Project mobile radio communications standard.

In an embodiment, the mobile radio communication device 200 may be configured in accordance with one or more of the following mobile radio communications standards:
- Universal Mobile Telecommunications System (UMTS) mobile radio communications standard;
- Long Term Evolution (LTE) mobile radio communications standard;
- Code Division Multiple Access (CDMA) mobile radio communications standard;
- Code Division Multiple Access 2000 (CDMA 2000) mobile radio communications standard;
- Freedom of Mobile Multimedia Access (FOMA) mobile radio communications standard;

Global System for Mobile Communications (GSM) mobile radio communications standard; and Enhanced Data rates for GSM Evolution (EDGE) mobile radio communications standard.

In another embodiment, the mobile radio communication device 200 may further include a smart card 212. In this embodiment, the smart card 212 in turn may include the memory 202 configured to store the home base station group member identifier 204 and optionally a processor, e.g. a microprocessor (not shown). In an embodiment, the smart card 212 may include a Subscriber Identity Module (SIM). In another embodiment, the smart card 212 may include a UMTS Subscriber Identity Module (USIM).

Furthermore, the home base station group member identifier 204 may be unique for each member of the home base station group.

In another embodiment, each member of the home base station group may be a subscriber of the home base station group. The home base station group may be a closed subscriber group (CSG).

In another embodiment, the mobile radio communication device 200 may further include a home base station local service circuit 214 configured to provide a home base station local service to the members of the home base station group. The home base station local service circuit 214, the message generator 206, and/or the memory 202 may be coupled with each other via the connection 210 such as e.g. a wire, a cable, an optical connection, a wireless connection (e.g. a short range radio connection), a bus connection, or the like. Alternatively, the home base station local service circuit 214 may be coupled with the message generator 206 and/or the memory 202 via separate connections such as e.g. separate wires, separate cables, separate optical connections, separate wireless connections (e.g. separate short range radio connections), separate bus connections, or the like. It should be noted that in an embodiment, the home base station local service circuit 214 and the message generator 206 may be implemented in one common processor.

In an embodiment, the home base station group member message is a Location Area Update (LAU) message.

In another embodiment, the home base station local service circuit 214 may be configured to provide voice service and/or a data service as a home base station local service. In another embodiment, the home base station local service circuit 214 may be configured to provide one or more of the following home base station local services:

a presence service,
an instant messaging service,
a message board service,
a voice mail box service,
a media streaming service,
a Voice over Internet Protocol service, and
an access control service.

In another embodiment, the home base station group member message may be a radio resource control (RRC) message, in other words a message in accordance with a radio resource control protocol layer. In another embodiment, the home base station group member message may be a radio resource control CONNECTION REQUEST message.

In another embodiment, the mobile radio communication device 200 may further include a transmitter 216 configured to transmit the home base station group member message 208. The transmitter 216, the home base station local service circuit 214, the message generator 206, and/or the memory 202 may be coupled with each other via the connection 210 such as e.g. a wire, a cable, an optical connection, a wireless connection (e.g. a short range radio connection), a bus connection, or the like. Alternatively, the transmitter 216 may be coupled with the home base station local service circuit 214, the message generator 206 and/or the memory 202 via separate connections such as e.g. separate wires, separate cables, separate optical connections, separate wireless connections (e.g. separate short range radio connections), separate bus connections, or the like. It should be noted that in an embodiment, the transmitter 216, the home base station local service circuit 214 and the message generator 206 may be implemented in one common processor.

Figure 3:
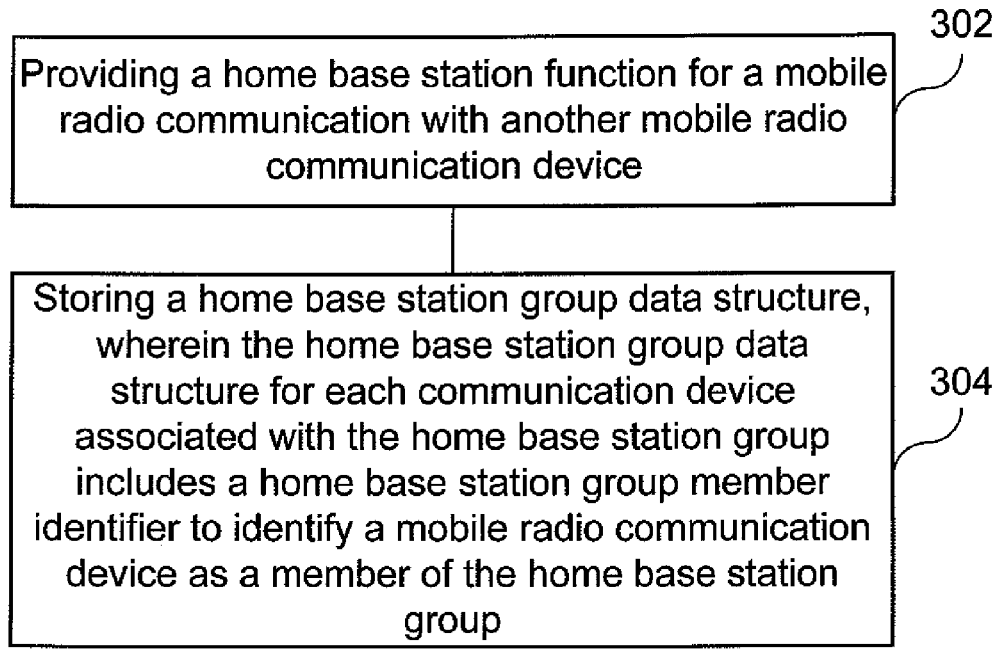
FIG. 3 shows a flow diagram illustrating a method for operating a mobile radio communication device in accordance with an embodiment.

FIG. 3 shows a flow diagram 300 illustrating a method for operating a mobile radio communication device in accordance with an embodiment.

In accordance with this method, in 302, a home base station function for a mobile radio communication with another mobile radio communication device is provided.

Furthermore, in 304, a home base station group data structure is stored, wherein the home base station group data structure for each communication device associated with the home base station group includes a home base station group member identifier to identify a mobile radio communication device as a member of the home base station group.

In various embodiments, the mobile radio communication device may be configured in accordance with a Third Generation Partnership Project mobile radio communications standard.

In various embodiments, the mobile radio communication device may be configured in accordance with one or more of the following mobile radio communications standards:

Universal Mobile Telecommunications. System (UMTS) mobile radio communications standard;

Long Term Evolution (LTE) mobile radio communications standard;

Code Division Multiple Access (CDMA) mobile radio communications standard;

Code Division Multiple Access 2000 (CDMA 2000) mobile radio communications standard;

Freedom of Mobile Multimedia Access (FOMA) mobile radio communications standard;

Global System for Mobile Communications (GSM) mobile radio communications standard; and Enhanced Data rates for GSM Evolution (EDGE) mobile radio communications standard.

In an embodiment, the home base station group data structure may further include a home base station group identifier to identify the home base station group. The home base station group member identifier may be unique for each member of the home base station group. In an embodiment, each member of the home base station group may be a subscriber of the home base station group. In an embodiment, the home base station group data structure may further include for each mobile radio communication device a mobile radio communication device identifier, wherein the mobile radio communication device identifier may be unique in the mobile radio communication core network.

In an embodiment, the mobile radio communication device identifier may be a Mobile Subscriber ISDN (MSISDN) number.

In an embodiment, the home base station group data structure may further include for each mobile radio communication device an availability information representing the availability of the mobile radio communication device within a radio coverage area of the mobile radio communication device.

In an embodiment, the method may further include determining the availability information using the home base station group member identifier.

In another embodiment, the method may further include receiving a home base station group member message which includes the home base station group member identifier.

The home base station group may be a closed subscriber group.

In various embodiments, the method may further include providing a home base station local service to the members of the home base station group using the home base station group member identifiers.

In various embodiments, the providing a home base station local service may include providing a voice service and/or a data service as a home base station local service.

In various embodiments, the providing a home base station local service may include providing one or more of the following home base station local services:
    a presence service,
    an instant messaging service,
    a message board service,
    a voice mail box service,
    a media streaming service,
    a Voice over Internet Protocol service, and
    an access control service.

In various embodiments, the method may further include providing the function of a radio resource control protocol.

In various embodiments, the method may further include providing the function of a non-access stratum protocol.

Figure 4:
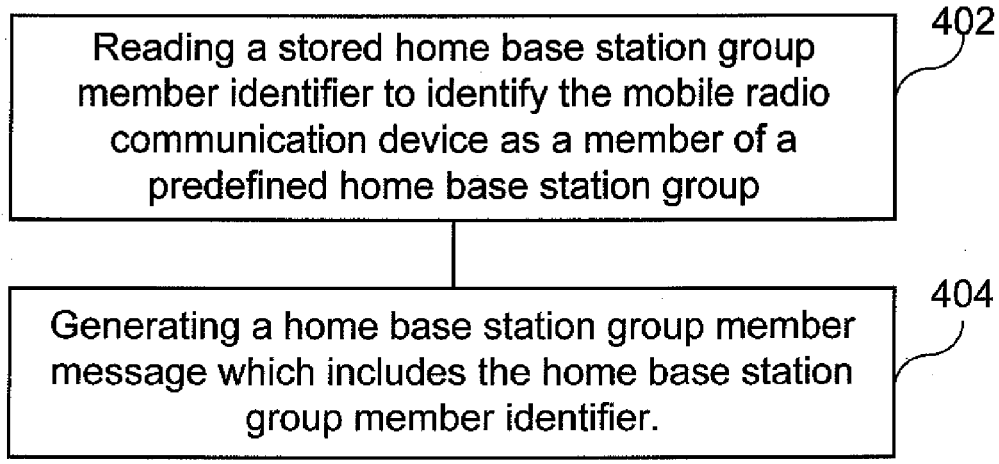
FIG. 4 shows a flow diagram illustrating a method for operating a mobile radio communication device in accordance with another embodiment.

FIG. 4 shows a flow diagram 400 illustrating a method for operating a mobile radio communication device in accordance with another embodiment.

In accordance with this method, in 402, a stored home base station group member identifier to identity the mobile radio communication device as a member of a predefined home base station group may be read.

Furthermore, in 404, a home base station group member message may be generated which includes the home base station group member identifier.

In various embodiments, the mobile radio communication device may be configured as a mobile radio communication terminal device.

In various embodiments, the mobile radio communication device may be configured in accordance with a Third Generation Partnership Project mobile radio communications standard.

In various embodiments, the mobile radio communication device may be configured in accordance with one or more of the following mobile radio communications standards:
    Universal Mobile Telecommunications System (UMTS) mobile radio communications standard;
    Long Term Evolution (LTE) mobile radio communications standard;
    Code Division Multiple Access (CDMA) mobile radio communications standard;
    Code Division Multiple Access 2000 (CDMA 2000) mobile radio communications standard;
    Freedom of Mobile Multimedia Access (FOMA) mobile radio communications standard;
    Global System for Mobile Communications (GSM) mobile radio communications standard; and
    Enhanced Data rates for GSM Evolution (EDGE) mobile radio communications standard.

In various embodiments, the reading a stored home base station group member identifier may include reading the stored home base station group member identifier from a smart card including the memory configured to store a home base station group member identifier. The smart card may be a Subscriber Identity Module (SIM). In various embodiments, the smart card may be a UMTS Subscriber Identity Module (USIM).

In various embodiments, the home base station group member identifier may be unique for each member of the home base station group. In various embodiments, each member of the home base station group may be a subscriber of the home base station group.

In various embodiments, the home base station group may be a closed subscriber group (CSG).

In various embodiments, the method may further include providing a home base station local service to the members of the home base station group.

In various embodiments, providing a home base station local service may include providing a voice service and/or a data service as a home base station local service.

In various embodiments, providing a home base station local service may include providing one or more of the following home base station local services:
    a presence service,
    an instant messaging service,
    a message board service,
    a voice mail box service,
    a media streaming service,
    a Voice over Internet Protocol service, and
    an access control service.

In various embodiments, generating the home base station group member message may include generating the home base station group member message as a radio resource control message.

In various embodiments, the radio resource control message may be a radio resource control CONNECTION REQUEST message.

In another embodiment, a mobile radio communication device may be provided. The mobile radio communication device may include a mobile radio communication protocol circuit configured to provide a home base station function for a mobile radio communication with another mobile radio communication device, and a memory configured to store a subscriber group, wherein the subscriber group for each communication device associated with the subscriber group may include a subscriber group member identifier to identify a mobile radio communication device as a member of the subscriber group.

In various embodiments, it is achieved to determine and provide information about the availability of mobile radio communication terminal devices in a home base station with a reduced signaling with the mobile radio communication core network.

In various embodiments, a home base station (e.g. a Home NodeB) is provided which is capable to keep track of the members of a closed subscriber group currently within the coverage of the home base station (e.g. a Home NodeB). Such information may be useful e.g. for local services, e.g. presence services, local intra home base station (e.g. a Home NodeB) connections or for logging purposes.

In various embodiments, a solution is provided to signal to a home base station (e.g. a Home NodeB) when a subscriber (e.g. out of the closed subscriber group) enters or leaves the coverage of the femto cell.

Figure 5:
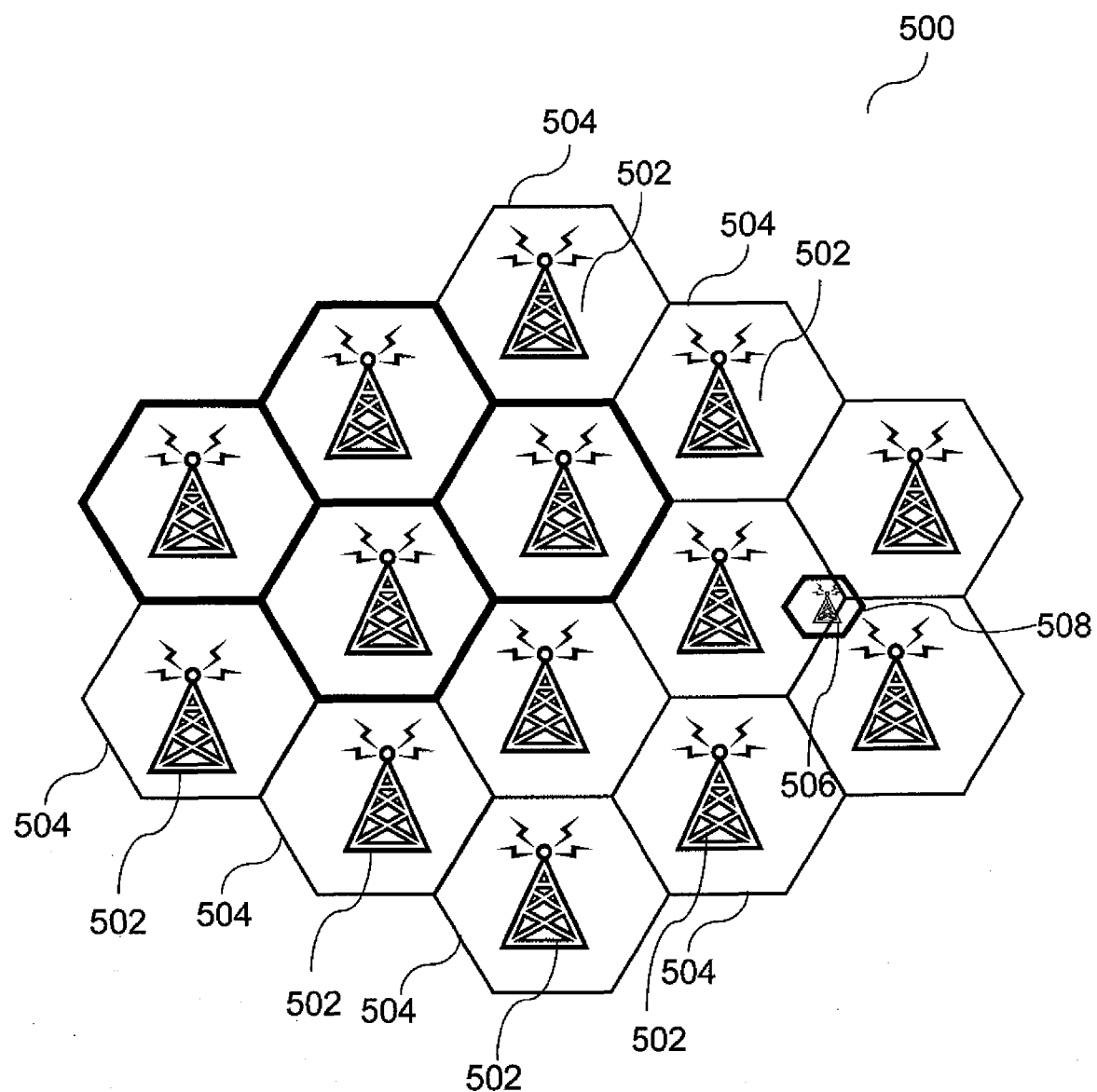
FIG. 5 shows a portion of a mobile radio communication system in accordance with an embodiment.

FIG. 5 shows a portion 500 of a cellular mobile radio communication system in accordance with an embodiment. As shown in FIG. 5, the mobile radio communication system may include a plurality (in general, an arbitrary number) of base stations 502 (e.g. configured as NodeBs 502, e.g. configured as eNodeBs 502), wherein at least one base station 502 may be respectively assigned to one mobile radio macro cell 504. Furthermore, one or more (in general, an arbitrary number of) home base stations 506, e.g. Home NodeB 506, e.g. Home eNodeB 506, wherein at least one home base station 506 may be respectively assigned to one mobile radio micro cell 508 (also referred to as mobile radio femto cell 508, for example).

In accordance with an embodiment, a Home (e)NodeB (which may be understood as the 3GPP terminology for 'Home Base Station' (HBS)) 506 may host a number of different functions, such as functions for Radio Resource Management, Radio Bearer Control, Radio Admission Control, Connection Mobility Control, IP header compression, and encryption of user data stream. A Mobility Management Entity (MME) (not shown) located in the mobile network operator's (MNO's) core network hosts functions for the distribution of paging messages to the eNBs 506, security control, idle state mobility control, SAE bearer control, ciphering and integrity protection of NAS signaling, while a Serving Gateway (not shown) which is also located in the MNO's core network in accordance with an embodiment hosts functions for switching the U-plane traffic to support mobile radio communication terminal device mobility. In an example, the Mobility Management Entity (MME) and the Serving Gateway may be combined for simplicity in a logical entity called Core Network Entity (CNE).

In an implementation, an architect's office is considered having 30 employees equipped with company mobile radio communication terminal devices. It is to be noted that this implementation is not limited to an office or a specific number of subscribers or employees. To enhance the coverage and to offer local services between the employees, a Home (e)NodeB, e.g. the home base station 506, may be installed in the office. To each employee a local (unique) ID (Identitiy) may be assigned within the "office member" group. A list of employees with local ID, MSIDN of the respective mobile radio communication terminal device, a user given name and NAS (Non Access Stratum) ID (s-TMSI, S-Temporary Mobile Subscriber Identity (same as TMSI in UMTS)) may be stored in a memory of the Home (e)NodeB, e.g. the home base station 506, and may look like this:

complex mobile radio communication network and mobile radio cell plans of a mobile radio communication network operator.

A mobile radio communication terminal device may perform measurements of the signal quality to the current mobile radio cell and mobile radio cells in the neighborhood on a regular timely basis. In an embodiment, each mobile radio cell broadcasts so called system information. One piece of system information is the information about the mobile radio communication network the mobile radio base station belongs to. A home base station (e.g. Home (e)NodeB) may also broadcast that it is a home base station (e.g. Home (e)NodeB). If the home base station (e.g. Home (e)NodeB) is in a closed mode (which may also be referred to as closed subscriber group mode) it also broadcasts the II) (CSG ID) of at least one allowed closed subscriber group (CSG). A mobile radio communication terminal device that explores a home base station (e.g. Home (e)NodeB) with best signal quality may read system information and may check the CSG ID against a white list which may be stored in the mobile radio communication terminal device, e.g. stored on the SIM or USIM to check whether the user is allowed to connect to the home base station (e.g. Home (e)NodeB). If the mobile radio communication terminal device is allowed to connect to the home base station (e.g. Home (e)NodeB) it now may camp on the home base station (e.g. Home (e)NodeB). If the home base station (e.g. Home (e)NodeB) belongs to a different location area (LA), the mobile radio communication terminal device may establish a connection to the Mobile Management Entity (MME) in the mobile radio core network and may perform a location area update. To do so, the mobile radio communication terminal device (e.g. the UE) may read the parameter of the Random Access Channel (RACH) and may send a preamble over this channel. In accordance with the RRC protocol implemented in the home base station (e.g. Home (e)NodeB), the home base station (e.g. Home (e)NodeB) (in more detail, the RRC unit implementing the RRC protocol layer in the home base station (e.g. Home (e)NodeB)) may respond on the Physical Downlink Control Channel (PDCCH) with a fixed timing. The content of the response

| localID | MSISDN | user given name | s-TMSI | status |
|---|---|---|---|---|
| 0 | 467017254746353 | John Doe | 0101000100100100100010001001001010101010011 | present |
| 1 | 467010987538453 | Kayle Smith | 0101000110010100100100100100101010100101 | present |
| 2 | 467017254845633 | Roberta Miller | 0101000101001010010100100100101010010010 | absent |
| ... | ... | ... | ... | ... |

The Local ID, the MSISDN and the user given names may be assigned by an administrator via a web interface of the Home (e)NodeB for management and maintenance purposes, for example. The s-TMSI and the status may be read into the communication between the mobile radio communication terminal device (e.g. the User Equipment, UE) and the Home (e)NodeB. This information should be securely stored (e.g. in a cryptographically protected manner) and should not be accessible via any interface to maintain privacy and confidentiality.

In an implementation, it may be assumed that a home base station (e.g. Home (e)NodeB) is assigned to a different location area (LA) than the mobile radio macro cells where the home base station (e.g. Home (e)NodeB) has overlapping coverage with. This assumption may be made because a home base station (e.g. Home (e)NodeB) usually is a consumer product which most probably would not be involved into the may be a Random Access Radio Network Temporary ID (RA-RNTI) to signal that this message is an answer to the random access and a Cell Radio Network Temporary ID (C-RNTI). The mobile radio communication terminal device (e.g. the UE) may now send an RRCConnectionRequest message via the Physical Uplink Shared Channel (PUS CH), for example. This message may contain a temporary ID to identify the mobile radio communication terminal device (e.g. the UE) in further proceedings. Either the s-TMSI may be used, if a s-TMSI is already allocated, or in the other case a random ID may be generated with a length of a predefined number of bits, e.g. with a length of 40 bits. The C-RNTI may not be used because it may happen that more than one mobile radio communication terminal device (e.g. the UE) may try to access the RACH at the same time. If the mobile radio cell is in a new location and no s-TMSI is assigned, the random ID may be used for contention resolution purpose. In various embodiments, contention resolution may be understood as the process of deciding which device gains access to a resource first when more than one wants to use it at the same time. The result of a succeeded RRC Connection establishment is the mobile radio communication terminal device (e.g. the UE) entering the RRC_connected state. In this state, the mobile radio communication terminal device (e.g. the UE) may be able to send Non Access Stratum (NAS) messages like the LA update.

Vice versa the mobile radio communication terminal device may perform another Location Area Update (LAU) if it leaves the HNB again. In this case (if an own location area is assigned to the home base station (e.g. Home (e)NodeB)), MME may hold information that the mobile radio communication terminal device is located in the home base station (e.g. Home (e)NodeB)) even if the mobile radio communication terminal device is in RRC_idle state.

One option to use this information of the users camping on the mobile radio cell of a home base station (e.g. Home (e)NodeB)) would be that the MME sends a new message (e.g. a hello_message) to the home base station (e.g. Home (e)NodeB)) to signal to the home base station (e.g. Home (e)NodeB)) that this respective mobile radio communication terminal device (and thus the corresponding subscriber) has entered the mobile radio cell of the home base station (e.g. Home (e)NodeB)). Accordingly, the MME could send another new message (e.g. a bye_message) to the home base station (e.g. Home (e)NodeB)) if a mobile radio communication terminal device has performed a LAU to a different LA than the LA of the home base station (e.g. Home (e)NodeB)) to signal that the mobile radio communication terminal device has left the mobile radio femto cell. On the other hand, these messages are only useful if the home base station (e.g. Home (e)NodeB)) stores the status of each subscriber and is associated mobile radio communication terminal device and uses it for local services like e.g. presence services. In such a case, it would be even more sufficient if a home base station (e.g. Home (e)NodeB)) does not rely on messages from MME, but evaluates the mobile radio RRC message to establish an mobile radio RRC connection.

This procedure according to various embodiments and the effects thereof will be described in more details below:

At the point of the procedure where the mobile radio communication terminal device (e.g. the UE) sends a RRCConnectionRequest message, the mobile radio communication terminal device in accordance with various embodiments optionally adds a local ID that belongs to the user in the RRCConnectionRequest message and signals to the home base station (e.g. Home (e)NodeB)) that this local user is entering the mobile radio cell of the home base station (e.g. Home (e)NodeB)). The local ID may be sent in every RRC-ConnectionRequest message since then until the mobile radio communication terminal device (e.g. the UE) leaves the mobile radio cell of the home base station (e.g. Home (e)NodeB)) to signal that the user (and thus the associated mobile radio communication terminal device (e.g. the UE)) is still in the mobile radio cell though the mobile radio communication terminal device (e.g. the UE) is in RRC_idle state.

One effect of the "RRC method" is in case the mobile radio communication terminal device (e.g. the UE) suddenly disappears (e.g. because the battery is low or the mobile radio communication terminal device (e.g. the UE) is switched off manually), there will be no LAU message. Because the mobile radio communication network would have no information about the status of the mobile radio communication terminal device (e.g. the UE), the mobile radio communication terminal device (e.g. the UE) performs an LA update even if camping on the same mobile radio cell after a defined timer has expired (e.g. a predefined number of minutes, e.g. 12 minutes). This (in various embodiments mandatory) LA update may be seen as a "ping of life" to the mobile radio communication network, which means that the mobile radio communication network is able to update the stored status after a mobile radio communication terminal device (e.g. the UE) has disappeared because the LAU is missing for a defined time. If the home base station (e.g. Home (e)NodeB)) listens to the RRC connections that are to be established before a LAU could be sent to the mobile radio core network and stores the current status of each subscriber and its corresponding mobile radio communication terminal device (e.g. the UE) according to various embodiments, it holds information about a subscriber and its corresponding mobile radio communication terminal device (e.g. the UE) who has left the mobile radio cell because the (in various embodiments mandatory) RRC connection requests are missing.

Another effect may be caused by the included local ID: To provide local services and take advantage of these services, the users should be able to address each other. But normally a base station (e.g. NodeB) has no information about the identity of its users. The users and their corresponding mobile radio communication terminal devices (e.g. the UEs) may be authenticated by the mobile radio core network and use temporary IDs like the s-TMSI. Therefore, users and their corresponding mobile radio communication terminal devices (e.g. the UEs) could not be addressed without a resolution of these temporary IDs by the mobile radio core network, which is in conflict with the idea of a local service. Ideally the home base station (e.g. Home (e)NodeB)) knows the limited amount of users and their corresponding mobile radio communication terminal devices (e.g. the UEs) in a closed subscriber group or at least these users and their corresponding mobile radio communication terminal devices (e.g. the UEs) who are allowed and willing to use local services like presence services or local message boards. The users and their corresponding mobile radio communication terminal devices (e.g. the UEs) could be ideally addressed with user friendly names like the MSISDN or user given names. If the home base station (e.g. Home (e)NodeB)) could resolve the temporary IDs into the user friendly names, local services could be easily offered within the home base station (e.g. Home (e)NodeB)). To reduce the traffic over the air interface a local user list may be stored in the home base station (e.g. Home (e)NodeB)) in accordance with various embodiments. In various embodiments, a user given name may be stored as well as the corresponding MSISDN, a local ID, the presence status and the temporary NAS ID for each user of local services or his corresponding mobile radio communication terminal device (e.g. the UE) in a table. According to various embodiments, the user of local services or his corresponding mobile radio communication terminal device (e.g. the UE) adds his local ID in the RRCConnectionRequest message to the (e.g. Home (e)NodeB)). The list stored in (e.g. Home (e)NodeB)) may be updated each time there is a change of the calculated user's presence status.

Referring back to the above described implementation with the 30 employees, if an employee enters the mobile radio femto cell (such as e.g. the mobile radio femto cell 508) with his mobile radio communication terminal device (such as e.g. the mobile radio communication terminal device 200, e.g. configured as a UE) in RRC_idle state (no active data connection or voice call are provided in this state, for example), in the office the Home (e)NodeB (e.g. the Home (e)NodeB 506) is the mobile radio cell with the best (in other words highest) signaling strength which is measured by the mobile radio communication terminal device (such as e.g. the mobile radio communication terminal device 200, e.g. configured as a UE) on a regular timely basis. Therefore, the mobile radio communication terminal device (such as e.g. the mobile radio communication terminal device 200, e.g. configured as a UE) may read system information broadcasted by the Home (e)NodeB (e.g. the Home (e)NodeB 506). Part of the information is that the mobile radio cell is a Home (e)NodeB (e.g. the Home (e)NodeB 506) in a closed subscriber group (which may include all employees, for example). The ID (Identity) of the closed subscriber group (CSG) may also be broadcasted. The mobile radio communication terminal device (such as e.g. the mobile radio communication terminal device 200, e.g. configured as a UE) may read this ID and may compare it with the closed subscriber group IDs stored e.g. in a memory of the mobile radio communication terminal device (such as e.g. the mobile radio communication terminal device 200, e.g. configured as a UE), e.g. in the memory 202 of the mobile radio communication terminal device 200, e.g. contained in the smart card 212, wherein the smart card 212 may be implemented as a SIM or USIM. If the ID matches to one of the list the mobile radio communication terminal device (such as e.g. the mobile radio communication terminal device 200, e.g. configured as a UE) reads the corresponding local ID the subscriber has been assigned to in the Home (e)NodeB (e.g. the Home (e)NodeB 506). Also part of the system information is the Location Area (LA) information. It may be assumed that the LA of the mobile radio femto cell is different from the LA of the mobile radio macro cells around the office. Following procedure for a LA update may be performed by the mobile radio communication terminal device (such as e.g. the mobile radio communication terminal device 200, e.g. configured as a UE) and the Home (e)NodeB (e.g. the Home (e)NodeB 506) (as shown in FIG. 6 and FIG. 7, which will be described in more detail below):

FIG. 6 shows a message flow diagram 600 illustrating an initial access procedure in accordance with an embodiment. In accordance with an embodiment, in an optional initial access procedure, in 602, the mobile radio communication device 100 (e.g. the home base station, e.g. the Home (e)NodeB 506) may generate an initialization message 604 which may include an information about the Random Access preamble assignment assigning the preamble to the mobile radio communication devices looking for random access to a e.g. Random Access Channel provided by the mobile radio communication device 100 (e.g. the home base station, e.g. the Home (e)NodeB 506) and sends this initialization message 604, e.g. in a broadcasting manner. In 606, the mobile radio communication terminal device 200 may receive the initialization message 604 from the mobile radio communication device 100 (e.g. the home base station, e.g. the Home (e)NodeB 506). In response to the receipt of the initialization message 604, in 608, the mobile radio communication terminal device 200 may generate a response message 610, which may include the assigned preamble, in other words, the predefined symbol sequence (e.g. bit sequence) and sends this predefined symbol sequence over the PRACH (Physical Random Access Channel) channel. In 612, the mobile radio communication device 100 may receive the response message 610 from the mobile radio communication terminal device 200 via the PRACH. In response to the receipt of the response message 610, in 614, the mobile radio communication device 100 may generate an access granting message 616, which may include a corresponding RA-RNTI and C-RNTI and may transmit the access granting message 616 over the PDCCH (Physical Downlink Control Channel) with a fixed timing to RACH (Random Access Channel) access to the mobile radio communication terminal device 200. With the receiving of the access granting message 616 in 618 on the side of the mobile radio communication terminal device 200, the initial access procedure may be completed.

After the initial access procedure, the mobile radio communication terminal device 200 may now start an RRC connection setup procedure, which is illustrated in a message flow diagram 700 in FIG. 7 and which will be described in more detail below.

As shown in FIG. 7, in 702, the mobile radio communication terminal device 200 may generate an RRC connection request message 704 and send the RRC connection request message 704 via e.g. the PUSCH (Physical Uplink Shared Channel) with a Random ID and, according to various embodiments, the local ID (see structure of an implementation of the RRC connection request message 704 as described in more detail below). After having received the RRC connection request message 704 in 706, the mobile radio communication device 100 (e.g. the home base station (e.g. the Home (e)NodeB)) may, in 708, generate an RRCConnectionSetup message 710 and may transmit the RRCConnectionSetup message 710 to the mobile radio communication terminal device 200. After having received the RRC connection setup message 710 in 712, the mobile radio communication terminal device 200 may, in 714, generate an RRCConnectionSetupComplete message 716 and may transmit the RRCConnectionSetupComplete message 716 to the mobile radio communication device 100, completing the RRC connection setup procedure with the receiving of the RRCConnectionSetupComplete message 716 on the side of the mobile radio communication device 100 in 718.

In the following example of the RRCConnectionRequest message 704 according to various embodiments in ASN.1 (Abstract Syntax Notation 1) as it is defined in 3GPP TS 36.331 the new optional element is marked by underlining:

```
RRCConnectionRequest ::= SEQUENCE {
    criticalExtensions CHOICE {
        rrcConnectionRequest-r8 SEQUENCE {
            ue-Identity SEQUENCE {
                CHOICE {
                    s-TMSI
                    randomValue BIT STRING (40)
                }
                localID INTEGER (0...255) OPTIONAL
                establishmentCause ENUMERATED
{ 'emergency highPriorityAccess mt-Access mo-Signalling mo-Data spare3 spare2 spare1'}
                spare BIT STRING (1)
            }
            criticalExtensions SEQUENCE {
            }
        }
    }
}
```

The home base station (e.g. the Home (e)NodeB) may update the entries in the local user table to refresh s-TMSI (e.g. allocated by MME in further proceedings and transmitted from MME to the home base station (e.g. the Home (e)NodeB)) and may update the presence status from "absent" to "present".

If e.g. a subscriber (in the following also referred to as John Doe) wants to see what colleagues are already in the office, he may use e.g. a local presence service to get a list of all local users and their corresponding mobile radio communication terminal devices with the presence status "present". To send another subscriber (in the following also referred to as Kayle Smith) a local message, he may start a local message application, may address Kayle Smith by his MSISDN (stored in his address book) or by his name. The home base station (e.g. the Home (e)NodeB) may deliver this message locally by using local higher NAS (Non-Access Stratum) layers. In current standards, the communication protocol stack of an (e)NodeB usually only goes up to the RRC layer as shown in the protocol layer diagram 800 in FIG. 8. To offer local services higher layer like NAS and application layers would be implemented into the home base station (e.g. the Home (c)NodeB) in accordance with various embodiments. A detailed description of these layers not be described in detail here for reasons of simplicity. The s-TMSI may be resolved with help of the said local user table within the home base station (e.g. the Home (e)NodeB) may without a transmission to the mobile radio core network. Other examples of local services may be instant messaging, a message board, voice mail box, media streaming, Voice over IP or access control to restricted areas.

FIG. 8 shows a protocol layer diagram illustrating a control plane protocol stack in accordance with an embodiment implemented in the mobile radio communication terminal device 200, the mobile radio communication device 100, and an MME 802.

As shown, in various embodiments, the mobile radio communication terminal device 200 may include or may have implemented the functionalities of the following communication protocol layers:

the physical layer (PHY) 804;
the Medium Access Control layer (MAC) 806;
the Radio Link Control layer (RLC) 808;
the Packet Data Convergence Protocol layer (PDCP) 810;
the Radio Resource Control layer (RRC) 812; and
the Non-Access Stratum layer (NAS) 814.

In various embodiments, the mobile radio communication device 100 (e.g. the home base station (e.g. the Home (e)NodeB)) may include or may have implemented the functionalities of the following communication protocol layers:

the physical layer (PHY) 804;
the Medium Access Control layer (MAC) 806;
the Radio Link Control layer (RLC) 808;
the Packet Data Convergence Protocol layer (PDCP) 810; and
the Radio Resource Control layer (RRC) 812.

Furthermore, in various embodiments, the MME 802 may include or may have implemented the functionalities of the Non-Access Stratum layer (NAS) 814.

The arrows shown in FIG. 8 represent respective logical peer-to-peer connections between the respective protocol layers.

By way of example, the following two possible adaptations to the optional localID may be provided in alternative embodiments:

1) The LocalID could also be stored in the member list of the Closed Subscriber Group (CSG). This list may be stored in the mobile radio communication network. In this case, the assignment of the localID has not to be done manually via an interface in the home base station (e.g. the Home (e)NodeB) and the mobile radio communication terminal device 200 (e.g. the UE), but is in all home base stations (e.g. the Home (e)NodeBs) which operate with this CSG the same. In this case, the LocalID could also be stored in the smart card of the mobile radio communication terminal device such as e.g. a SIM or USIM accordingly in the list of CSG IDs the subscriber is a member of. Effects of this adaptation may be the reduced administrational work to assign a LocalID. One localId would be used in different mobile radio femto cells with the same CSG ID. In this case several home base stations (e.g. the Home (e)NodeBs) with the same CSG could be easily linked to a common mobile radio communication network (e.g. via a VPN) without raising the addressing effort.

2) For a second adaptation it may be assumed that the first adaptation is used. In this case, the LocalID could be sent instead of a random mobile radio communication terminal device 200 (e.g. the UE) Initial ID in a home base station (e.g. the Home (e)NodeB), because the localID within a CSG is also unambiguous. In this case, there could be sent only one short ID instead of two what may lead to a reduced traffic over the limited air interface.

Various embodiments may include one or more of the following features:

Assign a local ID to a subscriber in each home base station (e.g. the Home (e)NodeB) he is allowed to use local services.

Storage of the local ID (e.g. with every closed subscriber group ID) in smart card (e.g. SIM or USIM) or mobile radio communication terminal device (e.g. the UE or Mobile Equipment (ME)).

Link the local ID to a user friendly name and/or MSISDN.

Link the local ID to by the mobile radio core network assigned.

Storage of the local ID in home base station (e.g. the Home (e)NodeB) (ideally with user given name, MSISDN and s-TMSI).

Add an optional element in the RRCConnetionRequest message to transmit the local ID.

Repeat adding the local ID element in every RRCConnectionRequest message or storage of a link between NAS ID and the local ID in the home base station (e.g. the Home (e)NodeB) to have the information about the presence of a subscriber even if his mobile radio communication terminal device (e.g. the UE or ME) is in RRC_idle state.

Use the local IDs to offer local services to and between users of a home base station (e.g. the Home (e)NodeB).

Implement local NAS layer in home base station (e.g. the Home (e)NodeB) (usually an implementation up to RRC layer is provided) to serve local connections without involving the mobile radio core network.

In an embodiment, it is clearly provided that e.g. RRC messages (such as e.g. a Location Area Update message) is not only forwarded by the home base station, but that the home base station intercepts the received RRC message and may determine e.g. the home base station group member identifier as described above, in other words, may determine the status of the user with respect to the home base station group member identifier and may store the determined status (e.g. presently available, presently non-available) for each user. Furthermore, the home base station may be configured to assign a home base station group member identifier to a communication terminal device and to store the assigned home base station group member identifier (together with an identifier of the communication terminal device). This (unique) assignment of a home base station group member identifier to a respective communication terminal device (using e.g. the MSISDN uniquely assigned to the communication terminal device or a freely given name) may also be stored in the Core Network in an alternative embodiment. Furthermore, the home base station may be configured to evaluate the home base station group member identifiers (e.g. to determine the status of the assigned communication terminal device with respect to its availability e.g. in the context of a local service such as e.g. in the context of a presence service, e.g. in a closed subscriber group (CSG).

Furthermore, the home base station may be configured to physically address the mobile radio communication terminal device(s) without the assistance of the Core Network.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication device, comprising:
   a mobile radio communication protocol circuit configured to provide a home base station function for a mobile radio communication with another mobile radio communication device;
   a memory configured to store a home base station group data structure, wherein the home base station group data structure for each communication device associated with the home base station group comprises a home base station group member identifier to identify a mobile radio communication device as a member of the home base station group;
   a home base station group member receiving circuit configured to receive a radio resource control (RRC) connection request message which includes the home base station group member identifier; and
   a home base station group member identifier determining circuit configured to determine the home base station group member identifier from the received RRC connection request message;
   wherein the home base station group data structure comprises for each mobile radio communication device an assignment information, wherein the assignment information assigns each home base station group member identifier to a respective mobile radio communication device identifier.

2. The mobile radio communication device of claim 1, wherein the home base station group data structure further comprises a home base station group identifier to identify the home base station group.

3. The mobile radio communication device of claim 1, wherein the home base station group data structure further comprises for each mobile radio communication device a mobile radio communication device identifier, wherein the mobile radio communication device identifier is unique in the core network.

4. The mobile radio communication device of claim 1, wherein the home base station group data structure further comprises for each mobile radio communication device an availability information representing the availability of the mobile radio communication device within a radio coverage area of the mobile radio communication device.

5. The mobile radio communication device of claim 1, wherein the home base station group member receiving circuit is further configured to receive a home base station group member message which includes the home base station group member identifier.

6. The mobile radio communication device of claim 5, wherein the home base station group member identifier determining circuit configured to determine a home base station group member identifier from the received home base station group member message.

7. The mobile radio communication device of claim 5, wherein the home base station group member message is a Location Area Update message.

8. The mobile radio communication device of claim 6, further comprising:
   a transmitter configured to transmit a message to the core network, wherein the message is selected from a group of messages consisting of:
   the home base station group member message;
   the home base station group member message reduced by the home base station group member identifier.

9. The mobile radio communication device of claim 1, wherein the home base station group is a closed subscriber group.

10. The mobile radio communication device of claim 1, further comprising:
    a home base station local service circuit configured to provide a home base station local service to the members of the home base station group using the home base station group member identifiers.

11. The mobile radio communication device of claim 10, wherein the home base station local service circuit is configured to provide those home base station group member identifiers that are subscribed to the home base station local service and that are presently available for the mobile radio communication device.

12. The mobile radio communication device of claim 10, wherein the home base station local service circuit is configured to provide a home base station local service selected from a group of services consisting of:
    a presence service;
    an instant messaging service;
    a message board service;
    a voice mail box service;
    a media streaming service;
    a Voice over Internet Protocol service; and
    an access control service.

13. The mobile radio communication device of claim 10, wherein the home base station local service circuit is configured to use the stored home base station group member identifier for physically addressing the respective communication device for the home base station local service.

14. A mobile radio communication device for communicating with another mobile radio communication device configured to provide a home base station function, the mobile radio communication device comprising:
    a memory configured to store a home base station group data structure comprising a home base station group member identifier to identify the mobile radio communication device as a member of a predefined home base station group; and
    a message generator configured to generate an RRC connection request message which includes the home base station group member identifier, for a mobile radio communication with the other mobile radio communication device configured to provide the home base station function for the mobile radio communication;
    wherein the home base station group data structure comprises for each mobile radio communication device an assignment information, wherein the assignment information assigns each home base station group member identifier to a respective mobile radio communication device identifier.

15. The mobile radio communication device of claim 14, being configured as a mobile radio communication terminal device.

16. The mobile radio communication device of claim 14, further comprising:
a smart card comprising the memory configured to store a home base station group member identifier.

17. The mobile radio communication device of claim 16, wherein the smart card comprises a Subscriber Identity Module.

18. The mobile radio communication device of claim 14, further comprising:
a home base station local service circuit configured to provide a home base station local service to the members of the home base station group.

19. The mobile radio communication device of claim 14, wherein the message generator is further configured to generate a Location Area Update message.

20. A method for operating a mobile radio communication device, the method comprising:
providing a home base station function for a mobile radio communication with another mobile radio communication device; and
storing a home base station group data structure, wherein the home base station group data structure for each communication device associated with the home base station group comprises a home base station group member identifier to identify a mobile radio communication device as a member of the home base station group receiving an RRC connection request message which includes the home base station group member identifier; and
determining the home base station group member identifier from the received RRC connection request message;
wherein the home base station group data structure comprises for each mobile radio communication device an assignment information, wherein the assignment information assigns each home base station group member identifier to a respective mobile radio communication device identifier.

21. The method of claim 20,
wherein the home base station group data structure further comprises for each mobile radio communication device a mobile radio communication device identifier, wherein the mobile radio communication device identifier is unique in the core network.

22. A method for operating a mobile radio communication device for communicating with another mobile radio communication device configured to provide a home base station function, the method comprising:
reading a stored home base station group data structure comprising a home base station group member identifier to identify the mobile radio communication device as a member of a predefined home base station group; and
generating an RRC connection request message which includes the home base station group member identifier, for a mobile radio communication with the other mobile radio communication device configured to provide the home base station function for the mobile radio communication;
wherein the home base station group data structure comprises for each mobile radio communication device an assignment information, wherein the assignment information assigns each home base station group member identifier to a respective mobile radio communication device identifier.

23. A mobile radio communication device, comprising:
a mobile radio communication protocol circuit configured to provide a home base station function for a mobile radio communication with another mobile radio communication device;
a memory configured to store a subscriber group, wherein the subscriber group for each communication device associated with the subscriber group comprises a subscriber group member identifier to identify a mobile radio communication device as a member of the subscriber group;
a home base station group member receiving circuit configured to receive an RRC connection request message which includes one of the home base station group member identifiers; and
a home base station group member identifier determining circuit configured to determine said one home base station group member identifier from the received RRC connection request message;
wherein the subscriber group comprises for each mobile radio communication device an assignment information, wherein the assignment information assigns each home base station group member identifier to a respective mobile radio communication device identifier.

24. A mobile radio communication device, comprising:
a mobile radio communication protocol circuit configured to provide a home base station function for a mobile radio communication with another mobile radio communication device;
a memory configured to store a home base station group data structure, wherein the home base station group data structure for each communication device associated with the home base station group comprises a home base station group member identifier to identify a mobile radio communication device as a member of the home base station group;
a home base station group member receiving circuit configured to receive a radio resource control (RRC) connection request message which includes the home base station group member identifier; and
a home base station group member identifier determining circuit configured to determine the home base station group member identifier from the received RRC connection request message;
wherein the home base station group data structure further comprises for each mobile radio communication device an availability information representing the availability of the mobile radio communication device within a radio coverage area of the mobile radio communication device.

25. A mobile radio communication device for communicating with another mobile radio communication device configured to provide a home base station function, the mobile radio communication device comprising:
a memory configured to store a home base station group data structure comprising a home base station group member identifier to identify the mobile radio communication device as a member of a predefined home base station group; and
a message generator configured to generate an RRC connection request message which includes the home base station group member identifier, for a mobile radio communication with the other mobile radio communication device configured to provide the home base station function for the mobile radio communication;
wherein the home base station group data structure further comprises for each mobile radio communication device an availability information representing the availability of the mobile radio communication device within a radio coverage area of the mobile radio communication device.

26. A method for operating a mobile radio communication device for communicating with another mobile radio communication device, the method comprising:
providing a home base station function for a mobile radio communication with the other mobile radio communication device; and
storing a home base station group data structure, wherein the home base station group data structure for each communication device associated with the home base station group comprises a home base station group member identifier to identify a mobile radio communication device as a member of the home base station group receiving an RRC connection request message which includes the home base station group member identifier; and
determining the home base station group member identifier from the received RRC connection request message;
wherein the home base station group data structure further comprises for each mobile radio communication device an availability information representing the availability of the mobile radio communication device within a radio coverage area of the mobile radio communication device.

27. A method for operating a mobile radio communication device for communicating with another mobile radio communication device configured to provide a home base station function, the method comprising:
reading a stored home base station group data structure comprising a home base station group member identifier to identify the mobile radio communication device as a member of a predefined home base station group; and
generating an RRC connection request message which includes the home base station group member identifier, for a mobile radio communication with the other mobile radio communication device configured to provide the home base station function for the mobile radio communication;
wherein the home base station group data structure further comprises for each mobile radio communication device an availability information representing the availability of the mobile radio communication device within a radio coverage area of the mobile radio communication device.

28. A mobile radio communication device, comprising:
a mobile radio communication protocol circuit configured to provide a home base station function for a mobile radio communication with another mobile radio communication device;
a memory configured to store a subscriber group, wherein the subscriber group for each communication device associated with the subscriber group comprises a subscriber group member identifier to identify a mobile radio communication device as a member of the subscriber group;
a home base station group member receiving circuit configured to receive an RRC connection request message which includes one of the home base station group member identifiers; and
a home base station group member identifier determining circuit configured to determine said one home base station group member identifier from the received RRC connection request message;
wherein the subscriber group further comprises for each mobile radio communication device an availability information representing the availability of the mobile radio communication device within a radio coverage area of the mobile radio communication device.

* * * * *

UNITED STATES PATENT AND TRADEMARK OFFICE
CERTIFICATE OF CORRECTION

| | | |
|---|---|---|
| PATENT NO. | : 8,615,258 B2 | Page 1 of 1 |
| APPLICATION NO. | : 12/357497 | |
| DATED | : December 24, 2013 | |
| INVENTOR(S) | : Luft et al. | |

It is certified that error appears in the above-identified patent and that said Letters Patent is hereby corrected as shown below:

In the Claims

Col. 20, Line 4-11, Claim 8 should be read as:

8. The mobile radio communication device of claim 5, further comprising: a transmitter configured to transmit a message to the core network, wherein the message is selected from a group of messages consisting of: the home base station group member message; the home base station group member message reduced by the home base station group member identifier.

Signed and Sealed this
Twenty-fourth Day of June, 2014

Michelle K. Lee
*Deputy Director of the United States Patent and Trademark Office*